United States Patent [19]

Toba

[11] Patent Number: 4,491,878
[45] Date of Patent: Jan. 1, 1985

[54] APPARATUS AND METHOD FOR FORWARD/REVERSE SLOW MOTION VIDEO REPRODUCTION

[75] Inventor: Akira Toba, Yokohama, Japan

[73] Assignee: Tokyo Shibaura Denki Kabushiki Kaisha, Kawasaki, Japan

[21] Appl. No.: 352,461

[22] Filed: Feb. 25, 1982

[30] Foreign Application Priority Data

Feb. 27, 1981 [JP] Japan .................................. 56-28217

[51] Int. Cl.³ ............................................. H04N 5/782
[52] U.S. Cl. .................................... 360/10.1; 358/312
[58] Field of Search ....................... 358/312, 323, 337; 360/10.1, 10.2, 10.3

[56] References Cited

U.S. PATENT DOCUMENTS 4,197,562  4/1980  Kikuya et al. .
4,328,518  5/1982  Kawata et al. ..................... 360/10.3

FOREIGN PATENT DOCUMENTS 2835837  2/1979  Fed. Rep. of Germany .
2941803  4/1980  Fed. Rep. of Germany .
2930983  2/1981  Fed. Rep. of Germany .
2078430  1/1982  United Kingdom .

OTHER PUBLICATIONS

Funkschau, Heft 4, 1980—pp. 66–68.

*Primary Examiner*—Robert L. Richardson
*Attorney, Agent, or Firm*—Cushman, Darby and Cushman

[57] ABSTRACT

Disclosed is a four-head image reproduction system for performing a slow motion video reproduction in the forward and reverse directions by intermittently repeating stoppage and normal speed operation of a magnetic tape on which images are recorded in accordance with the azimuth technique. In response to a reproduction control signal which has reference pulses of a predetermined polarity generated from a detecting section including a control head, a control section first receives the reference pulse regardless of the forward or reverse slow reproduction mode and then stops a capstan when a period of time corresponding to half the period of the reference pulse elapses. In this condition, the level of a pair of heads for special reproduction mounted on a rotating drum is set to have a predetermined difference from that of a pair of heads for normal recording/reproducing.

7 Claims, 23 Drawing Figures

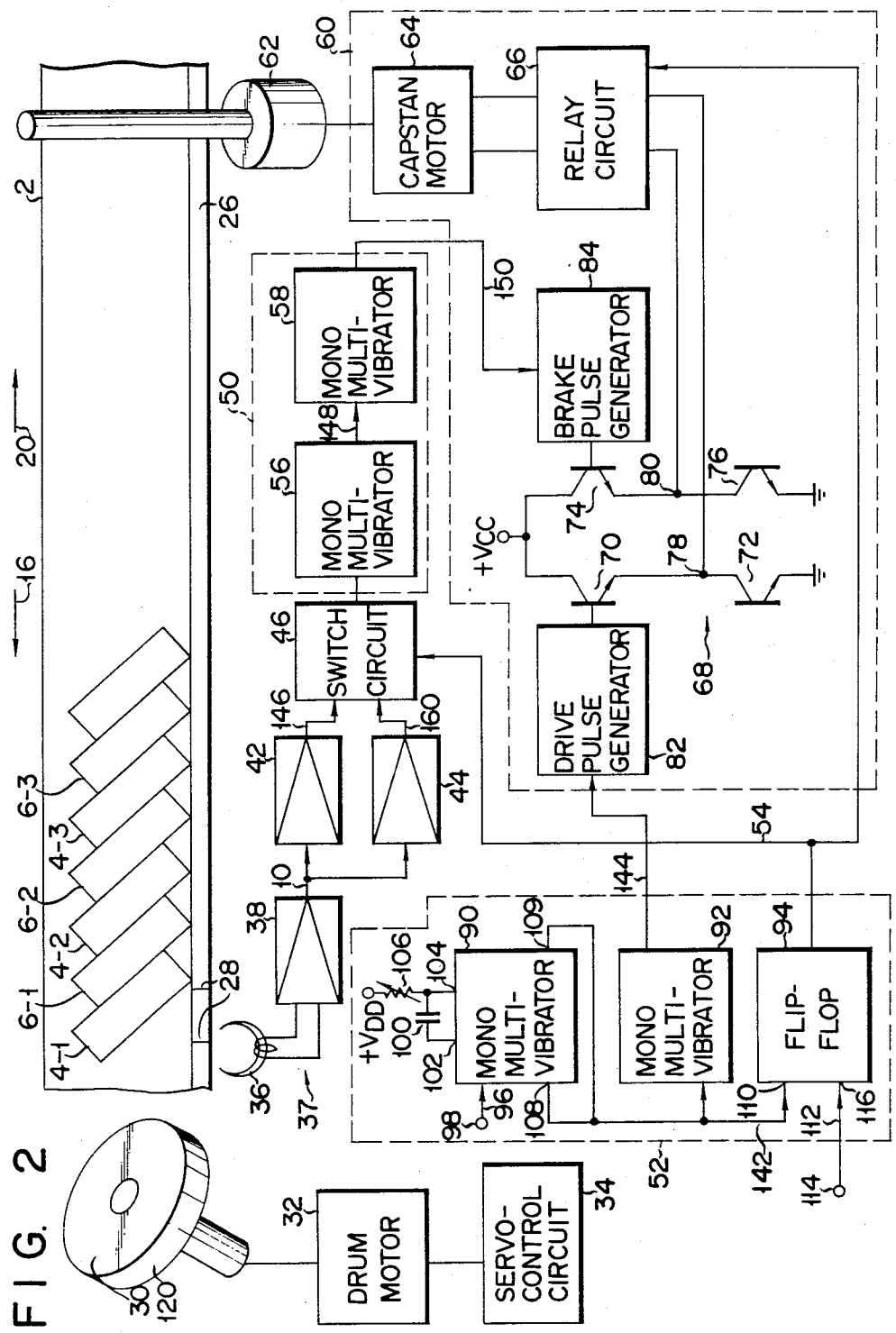
F I G. 2

FIG. 6
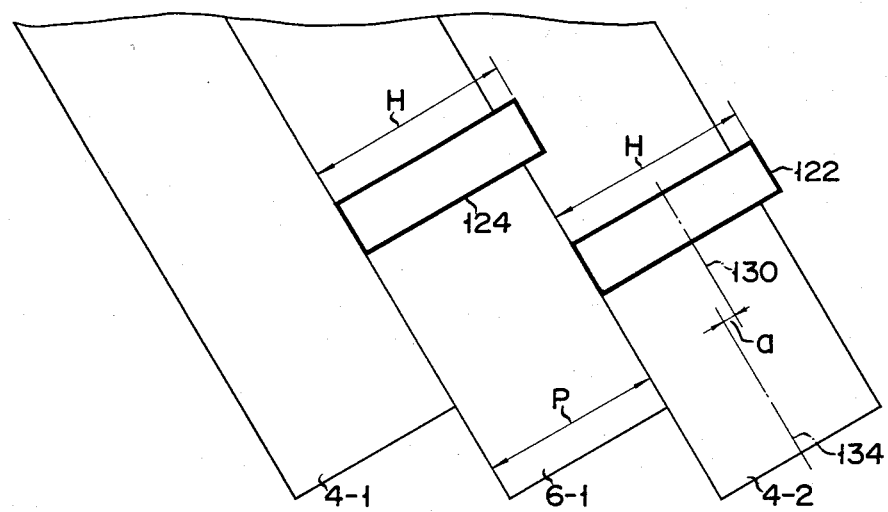
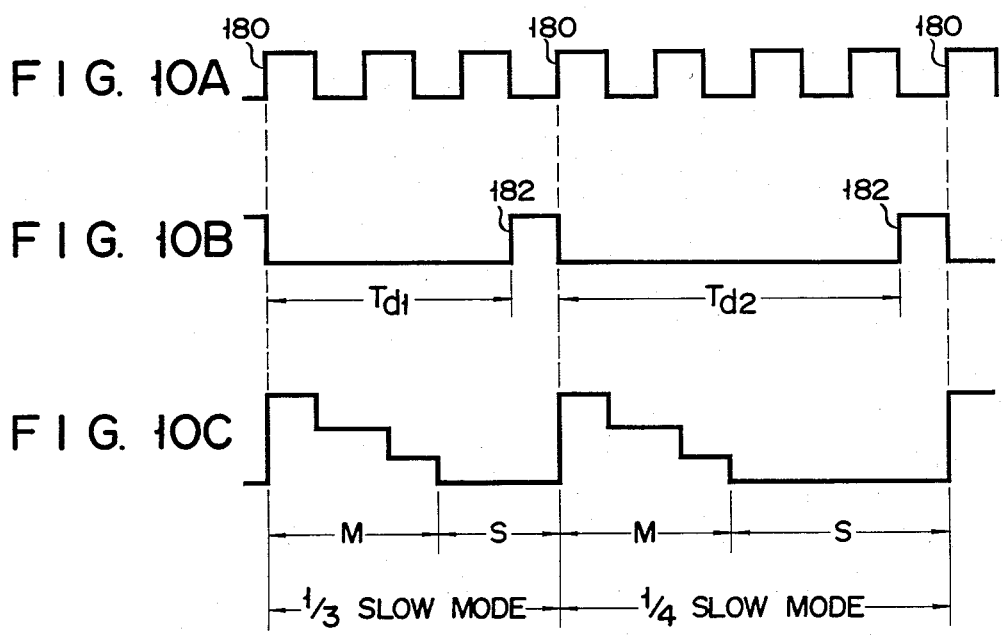
FIG. 10A
FIG. 10B
FIG. 10C

APPARATUS AND METHOD FOR FORWARD/REVERSE SLOW MOTION VIDEO REPRODUCTION

The present invention relates to apparatus and method for forward/reverse slow motion video reproduction, in which a slow motion picture can be reproduced in both forward or reverse directions by intermittently operating a magnetic tape.

To improve the quality of a video image obtained by slow motion reproduction (hereafter referred to as slow reproduction), conventional helical-scanning-type video-image reproduction apparatuses normally execute slow reproduction by repeating a still reproduction and normal reproduction with respect to one of two field tracks that form a single frame. Accordingly, a magnetic tape is intermittently operated by a capstan motor; i.e., the tape is allowed to repetitively stop and run at a normal running speed. In addition to a pair of normal recording/reproduction heads, a pair of special reproduction heads are provided on a rotary drum for special reproduction purposes, which includes slow reproduction. The normal recording/reproduction heads (hereafter called "first and second heads"), which have different azimuth angles from each other, are located opposite each other on the peripheral surface of a drum. The special reproduction heads (hereafter called "third and fourth heads") have the same azimuth angle as one of the two frame-forming field tracks. These special reproduction heads are arranged opposite each other at about right angles away from the normal heads on the drum surface. An example of this four-head arrangement may be found in Ser. No. 293,939 (filed 8/18/81, now abandoned in favor of a continuation application).

Because the magnetic tape stops for a still reproduction (which is part of a slow reproduction), the locus of the third and fourth heads deviates from the inclination of a to-be-traced field track by an angle corresponding to the difference in tape running speed between a still speed (zero) and a normal running speed. This deviation inevitably reduces the amount of reproduction signals picked up at a still reproduction mode and decreases the S/N ratio, thus deteriorating a reproduced video image. To prevent this deterioration, the prior art necessarily permitted the third and fourth heads to trace the field track along its diagonal ine. This leads to problems during reverse slow reproduction.

To stop the magnetic tape intermittently, the conventional apparatuses require a control circuit which controls the ON/OFF operation of the capstan motor in response to a control pulse signal. The control pulse signal is prerecorded on a control track, which is formed on one edge of the magnetic tape in a lengthwise direction of the tape, and may have negative and positive pulse components. These pulse components are alternately generated at equal intervals. The control circuit will brake the capstan motor after a given time elapses from the first detection of, for example, the positive pulse. The given time is set to be longer than the time between the generation of the positive pulse and that of the negative pulse, so that that third and fourth heads are allowed to trace the field track along its diagonal line, and attain a better braking characteristic. Therefore, when the magnetic tape runs more than one track after the detection of the positive pulse (reference pulse), the control system enables the tape to stop and permits the third and fourth slow reproduction heads to repetitively trace the field track substantially along the diagonal line of the track. This will produce good video images at a forward slow reproduction mode.

However, where the running direction of the magnetic tape is reversed in order to provide a reverse slow reproduction, the time between the appearance of the reference positive pulse and braking of the capstan motor is shorter than the time needed for the tape to run a single track. As a result, the braking characteristic will deteriorate, and it will be very difficult to abruptly stop a capstan system, such as the capstan motor and a capstan flywheel, without adversely affecting the reproduction system. Further, if the magnetic tape stops after the braking point passes, which corresponds to the location on the tape where the third and fourth heads trace the track accurately and diagonally, the tracing locus of these heads deviates considerably from the diagonal line of the track. This results in a lower amount of reproduction output signals and a lower S/N ratio of the reproduced images.

Conventional video image reproduction apparatuses, therefore, cannot perform both forward and reverse slow reproductions without deteriorating the quality of reproduced video images.

The present invention to provide—good quality apparatus and method for performing a slow motion reproduction which includes still reproduction and normal reproduction in the forward and reverse directions, in which a slow motion picture of good quality is accomplished in both the forward and reverse directions.

According to the present invention, recording tracks are inclined and mutually in contact with each other. A magnetic tape on which a pulse signal corresponding to each track position is recorded is intermittently stopped, so that good quality slow reproduction in both forward and reverse directions is performed. The pulse signal recorded on the tape is detected by a detection section. An electrical signal is generated from the detection section. The electrical signal includes reference pulses of predetermined polarity, the reference pulses being sequentially generated at predetermined time intervals. In a predetermined period of time after the reference pulse is detected, a control section interrupts the tape travel. The predetermined period of time is substantially half the time interval of the reference pulse. At a rotating drum are disposed first and second heads which perform normal recording and reproducing of the image, and third and fourth heads which perform special reproduction. The height of the third and fourth heads in the axial direction of the rotating drum differs from that of the first and second heads by a distance corresponding to a difference between the central trace of the first and second head when the magnetic recording tape is stopped and the diagonal line of the recording track formed on the magnetic recording tape.

BRIEF DESCRIPTION OF THE DRAWINGS

FIG. 2 is a view showing the overall arrangement of a video reproduction system which performs a slow reproduction in the forward and reverse directions according to one embodiment of the present invention;

FIG. 6 is a model view for explaining the relation between the head width of FIG. 4 and the recording track width formed on the magnetic tape of FIG. 2 with an overlap recording technique;

FIGS. 10A to 10B show waveforms of signals generated at the main parts of the embodiment of FIG. 2 when the slow reproduction speed is changed.

DETAILED DESCRIPTION OF THE PREFERRED EMBODIMENT

Figure 1:
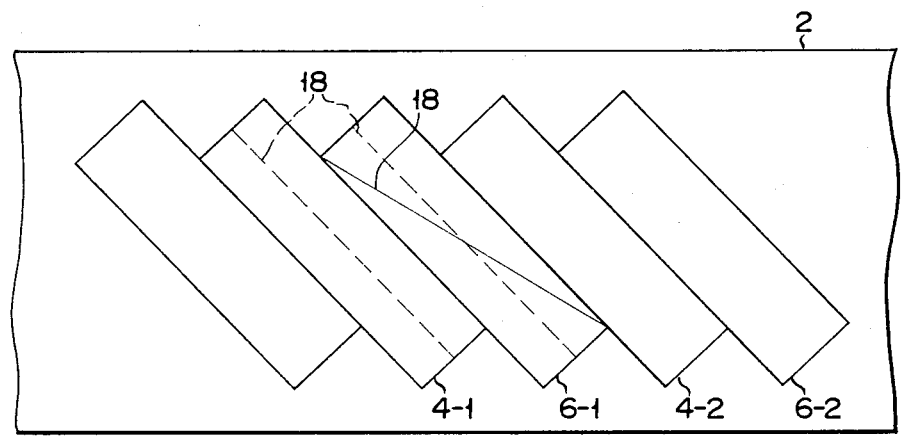
FIG. 1 illustrates how the special reproduction heads of a known video reproduction system traces the field tracks of a magnetic tape during still picture reproduction and shows the waveform of a reproduction control signal used to achieve the still reproduction.
Figure 1:
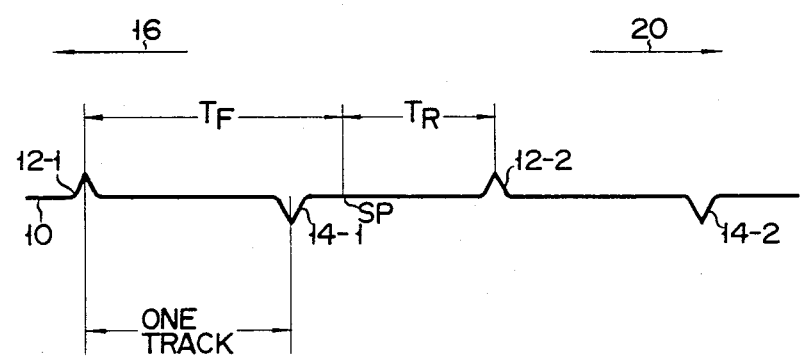

Before describing an embodiment of the present invention, it will be described, with reference to FIG. 1, how a magnetic tape must be stopped in a known 4-head video reproduction system. FIG. 1 shows a magnetic tape 2. Formed on tape 2 are recording tracks 4 and 6. Tracks 4 and 6 are formed on tape 2 according to the known azimuth recording technique. To reproduce a video signal, a normal recording/reproducing head 10 scans each track. A reproduction control signal 10 includes positive pulses 12-1, 12-2, . . . and negative pulses 14-1, 14-2, . . . Positive pulse 12 and negative pulse 14 recur alternately at regular intervals. The time interval between every positive pulse 12 and the immediately following negative pulse 14 corresponds to a track pitch.

To reproduce a slow motion picture in the forward direction by performing both the still picture reproduction and the normal reproduction, using a pair of special reproduction heads, magnetic tape 2 is intermittently run in the forward direction indicated by arrow 16, each time for scanning, for example, two tracks. In order to make the special reproduction heads start moving from the same portion of every field track 6 so as to reproduce a still picture, it is necessary to stop tape 2 upon lapse of a predetermined time after positive pulse 12-1, for example, is generated. Further, in order to generate the best possible output signal, the special reproduction heads must move along a diagonal 18 of the field track 6-1.

For the above-mentioned purpose tape 2 must be stopped at time SP. That is, during the forward slow reproduction, the tape must be stopped after running more than one-track distance in response to positive pulse 12-1. The period $T_F$ between pulse 12-1 and time SP is therefore longer than the period during which tape 2 runs one-track distance. During the still picture reproduction the special reproduction heads traces track 6-1 along a diagonal 18, thereby reproducing a still picture of good quality. When the tape is run in the reverse direction, or in the direction of arrow 20 during the reverse slow reproduction, the period $T_R$ becomes shorter than the period during which tape 2 runs one-track distance. Therefore it becomes necessary to stop tape 2 before it runs one-track distance in response to positive pulse 12-2. For the capstans (not shown in FIG. 1) it is extremely difficult to stop tape 2 so abruptly and accurately as mentioned above. Hence, during the reverse slow reproduction tape 2 cannot be stopped precisely at time SP even if it is braked at the still picture reproduction. The special reproducing heads cannot trace track 6-1 along diagonal 18. Consequently, their output signals will be small and will have a lower S/N ratio, and the image reproduced from the signals will have a poor quality.

As described above, it is very difficult for the known 4-head video reproduction system to move the special reproduction heads along the diagonal of each field track, no matter whether the magnetic tape runs in forward direction or reverse direction. That is, the known system cannot reproduce an image of good quality regardless of the tape running direction.

FIG. 2 illustrates one form of a video reproduction system in forward and reverse slow reproduction modes. Two kinds of field tracks 4 and 6 are mutually in contact in an inclined position on magnetic tape 2 in accordance with a known azimuth recording technique. A pulse 28 corresponding to a vertical synchronous signal (reproduction control signal) for each track is recorded on one end region 26 (control track) of magnetic tape 2. A rotating drum 30 is relatively disposed so as to be inclined at a predetermined angle with respect to the transportation direction of tape 2. Therefore, the inclined angle of tracks 4 and 6 on tape 2 is determined by the relative speed between rotating drum 30 and tape 2 when tape 2 travels at the normal speed in forward direction 16. Rotating drum 30 is driven by a drum motor 32. Drum motor 32 is properly controlled by a servo control circuit 34 in accordance with a known method.

Figure 3:
FIG. 3 is a timing chart of a reproduction control signal which is detected by the control head according to the embodiment of FIG. 2.

A control head 36 which is included in a detecting section 37 traces control track 26 of tape 2. Control head 36 is connected to a signal amplifier 38. When tape 2 is transported in the normal reproduction mode, a reproduction control signal 10 which contains positive and negative pulse components as shown in FIG. 3 is supplied from signal amplifier 38. The output terminal of signal amplifier 38 is connected to a switch circuit 46 through pulse amplifiers 42 and 44 which are connected in parallel. First pulse amplifier 42 serves to amplify and shape only positive pulses among the pulses contained in reproduction control signal 10. Second pulse amplifier 44 serves to amplify and shape negative pulse components. Switch circuit 46 selectively supplies an output signal from one of amplifiers 42 and 44 to a control section 50 which is arranged in the subsequent stage of switching circuit 46 in accordance with the forward or reverse slow reproduction mode. Switch circuit 46 operates in response to a mode designation signal 54 supplied from a slow reproduction mode designation section 52. The arrangement of slow reproduction mode designation section 52 will be described later.

Control section 50 comprises a tracking delay adjusting circuit 56 and a brake pulse width setting circuit 58. These circuits 56 and 58 comprise monostable multivibrators (mono-multivibrators). The TC-4528BP multivibrator manufactured and sold by Tokyo Shibaura Denki Kabushiki Kaisha (Kawasaki-shi, Kanagawa-ken, Japan) is used as the mono-multivibrators 56 and 58 in this embodiment. Tracking delay adjusting circuit 56 is connected to a tracking fine-adjustment section (not shown) which is manually operated in the forward slow reproduction mode and a tracking fine-adjustment section (not shown) which is used in the reverse slow reproduction mode. Tracking delay adjusting circuit 56 serves to vary the tracking delay in accordance with adjustment by an operator. Brake pulse width setting circuit 58 sets the pulse width of the brake pulse for a capstan drive section 60 connected to a capstan 62 in accordance with the slow motion speed.

Capstan drive section 60 comprises a capstan motor 64 for rotating capstan 62, a relay circuit 66 and a drive circuit 68. Drive circuit 68, for example, includes four npn type transistors 70, 72, 74 and 76. Two transistors 70 and 72 are connected in series, and two other transistors 74 and 76 are also connected in series. A power source voltage $+V_{CC}$ is supplied to the collector electrodes of transistors 70 and 74. The emitter electrodes of transistors 72 and 76 are grounded. A common node 78 of transistors 70 and 72 and a common node 80 of transistors 74 and 76 are connected to capstan motor 64 through relay circuit 66. Further, the base electrode of transistor 70 is connected to a drive pulse generator 82, while the base electrode of transistor 74 is connected to a brake pulse generator 84. Therefore, when capstan motor 64 is driven, transistors 70 and 76 are rendered conductive. A positive voltage is supplied to relay circuit 66. On the other hand, when capstan motor 64 is stopped, transistors 72 and 74 are rendered conductive. A negative voltage is supplied to relay circuit 66. In this condition, relay circuit 66 arranges the polarity of voltage from drive circuit 68 and supplies the arranged voltage to capstan motor 64 in response to mode designation signal 54 from mode designation section 52 in accordance with the forward or reverse slow reproduction mode. In particular, when the forward slow reproduction mode is initiated, the positive or negative voltage described above is supplied to capstan motor 64 without modification, so that capstan motor 64 repeats the forward rotation and stoppage. On the other hand, when the reverse slow reproduction mode is initiated, relay circuit 66 reverses the polarity of voltage supplied from drive circuit 68, so that capstan motor 64 repeats the reverse rotation and stoppage. At this time, magnetic tape 2 is intermittently driven in the reverse direction indicated by an arrow 20.

The slow reproduction mode designation section 52, for example, comprises two mono-multivibrators 90 and 92 and a D type flip-flop 94. The TC-4528 multivibrator manufactured by Tokyo Shibaura Denki Kabushiki Kaisha is used as the mono-multivibrators 90 and 92 in this embodiment. The TC-4013 multivibrator manufactured by the same company is used for the D type flip-flop 94. An RF switching pulse signal 96 is supplied to mono-multivibrator 90 through an input terminal 98. In response to RF switching pulse signal 96, the transportation duration (duration between two adjacent drive pulses), which alternates with the stoppage of tape 2, is determined. Therefore, the slow reproduction speed (e.g., ½ slow, ¼ slow) is determined. A capacitor 100 is connected between terminals 102 and 104 (generally delay terminals) of mono-multivibrator 90. A variable resistor 106 for slow tracking is connected in series with one delay terminal 104. A drive voltage $+V_{DD}$ is applied to variable resistor 106. Further, terminals 108 and 109 (respectively B and $\overline{Q}$ terminals) of mono-multivibrator 90 are connected to another mono-multivibrator 92 and D type flip-flop 94. Mono-multivibrator serves to determine the drive pulse width. The output from mono-multivibrator 90 is supplied to a first input terminal 110 (called CP terminal) of D type flip-flop 94. On the other hand, a slow reproduction mode switching signal 112 is supplied to a second input terminal 116 (D terminal) of flip-flop 94 through a signal input terminal 114. Slow reproduction mode switching signal 112 is selectively set at high or low potential in the forward or reverse slow reproduction mode. Therefore, based on input signal 112 described above, flip-flop 94 generates slow reproduction mode designation signal 54 which indicates the forward or reverse slow reproduction mode. Slow reproduction mode designation signal 54 is supplied to switch circuit 46 and relay circuit 66 which, in turn, operate in response to signal 112 as described above.

Figure 4:
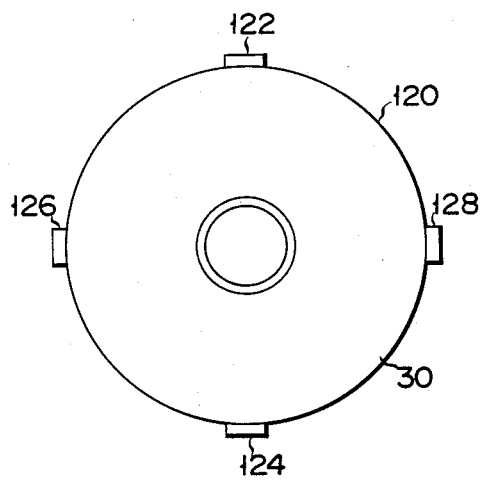
FIG. 4 is a plan view of the rotating head of FIG. 2 which mounts four heads.

FIG. 4 is a plan view of rotating drum 30 of FIG. 2. Four heads 122, 124, 126 and 128, for example, are disposed on periphery 120 of rotating drum 30. A pair of heads 122 and 124 are used for normal recording and reproduction and have different azimuths from the other pair. For example, head 122 (first head) is arranged at a first azimuth (corresponding to a track 4) and head (second head) 124 is arranged at a second azimuth (corresponding to a track 6). Referring to FIG. 4, heads 126 and 128 (third and fourth heads) are used for special reproduction. Third and fourth heads 126 and 128 oppose each other on periphery 120 of rotating drum 30. In this embodiment, a line connecting first and second heads 122 and 124 and another line connecting third and fourth heads 126 and 128 are substantially perpendicular to each other. Third and fourth heads 126 and 128 have the same azimuth, for example, and they are set at the second azimuth.

Figure 5A:
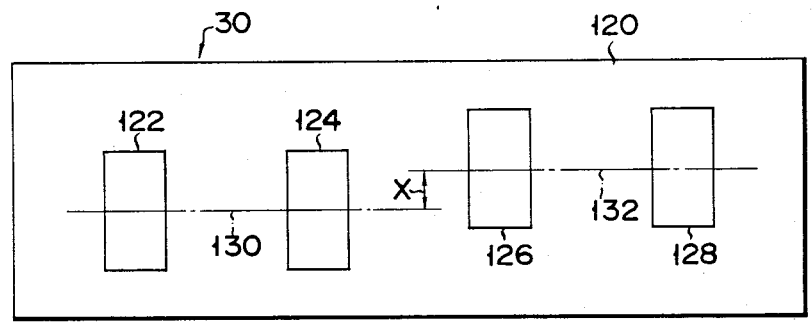
FIGS. 5A and 5B are views for explaining the level difference of a pair of normal recording/reproducing heads and a pair of special reproducing heads which are mounted on the periphery of rotating head of FIG. 4.

FIG. 5A is a view linearly developing periphery 120 for illustrative convenience of the mounting height of first to fourth heads 122, 124, 126 and 128 mounted on rotating drum 30 in the axial direction. In the figure, first and second heads 122 and 124 for normal reproduction are illustrated in the left side of the figure for easy understanding. A virtual reference line 130 passing the center of first and second heads 122 and 124 corresponds to the reference level. Therefore, first and second heads 122 and 124 are mounted on the same reference level. On the other hand, third and fourth heads 126 and 128 for special reproduction are disposed so as to have a predetermined level difference X from the reference level (line 130) of first and second heads 122 and 124. In other words, a virtual reference line 132 passing the center of third and fourth heads 126 and 128 is substantially parallel to virtual reference line 130. The distance between virtual reference lines 130 and 132 is equal to level difference X. In this manner, third and fourth heads 126 and 128 are disposed so as to have level difference X from first and second heads 122 and 124 in the axial direction of rotating drum 30. The trace of third and fourth heads 126 and 128 on magnetic tape 2 is moved parallel with that of first and second heads 122 and 124 in accordance with level difference X.

The setting conditions for level difference X between the heads will be described in detail. FIG. 6 illustrates the relation between track pitch P and head width H of first and second heads 122 and 124 for normal recording/reproducing, in accordance with the overlap recording technique. Head widths H of first and second heads 122 and 124 are the same. Head width H is set to be larger than track pitch P. In the multiple recording system, a track center 134 and a center 130 (virtual reference line) of heads 122 and 124 are not aligned. This central shift distance a is given by the following relation:

$$a = (H-P)/2 \text{ (for } H>P\text{)} \quad (1)$$

Figure 7:
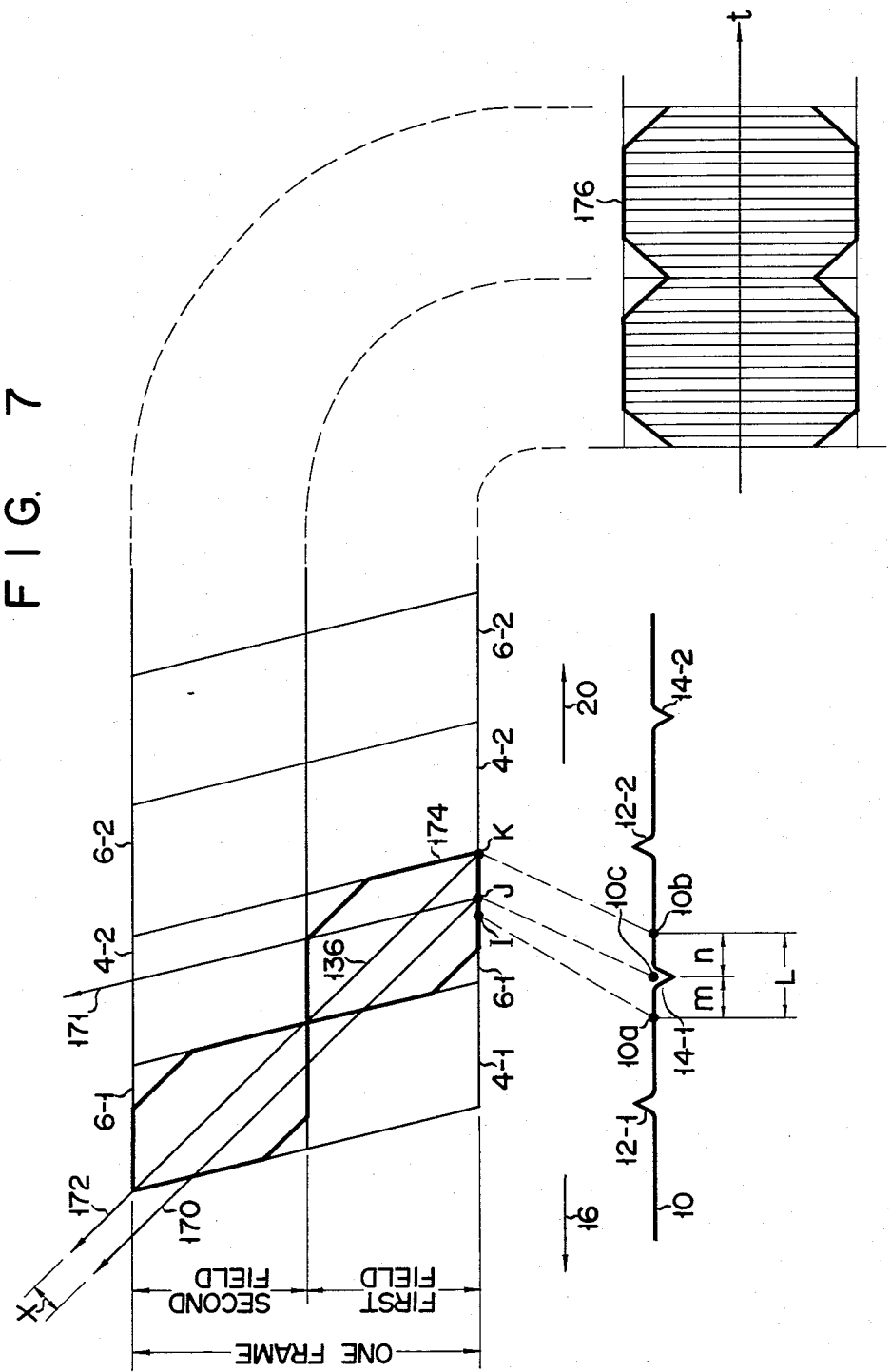
FIG. 7 is a view for illustratively explaining the trace of normal recording/reproducing heads and the special reproducing heads on the periphery of rotating heads at a different height level, the trace of which corresponds to the reproduction control signal in the still reproduction mode of the slow reproduction, and is also a view illustrating a reproduction output envelope of one frame which is obtained by the above operation according to the present invention.

FIG. 7 illustrates the correlation between reproduction control signal 10 of FIG. 2 and tracks 4 and 6 on magnetic tape 2 for the one-frame reproduction period. A point 10a plotted on control signal 10 corresponds to a leading end I of a recording track 6-1 of second head 124. In this case, a point 10b corresponds to a head stopping point K which is required for having third and fourth heads 126 and 128 for special reproduction trace on a diagonal line 136 of track 6-1 adjacent to track 4-1. A distance L between the two points 10a and 10b on control signal 10 is the same as the period for traveling the magnetic tape by ½ track. For example, in this embodiment, the one-track traveling period is substantially 16.7 msec. Thus, distance L described above is substantially 8.33 msec. Therefore, in order to calculate the central shift distance a of first and second heads 122 and 124 by multiple recording in units of time, assume that the duration between point 10a and negative pulse 14-1 (middle point between two positive pulses 12-1 and 12-2) is defined as m and the duration between the negative pulse and point 10b is defined as n. The following relations are thus given:

$$m = \frac{H-P}{2P} \times T_V \quad (2)$$

$$n = \left(\frac{1}{2} - \frac{H-P}{2P}\right) \cdot T_V \quad (3)$$

where $T_V$ is the field time. In the above relations, the distance of video track pitch of magnetic tape 2 which is derived from the duration n is the same as level difference X between the heads (FIG. 5). Based on the above consideration, level difference X is set in the following relation.

$$X = P \cdot \left(\frac{1}{2} - \frac{H-P}{2P}\right) \quad (4)$$

In this embodiment, level difference X is set to be about 6.5 μm when head width H is 27 μm and track pitch P is 2.0 μm, for example. Level difference X corresponds to a distance between tape stopping point K and a trace initiating point J of the head for normal recording/reproducing when tape 2 is stopped on field track 6-1 of FIG. 7 in response to the negative pulse of reproduction control signal 10.

Figure 8A:
FIGS. 8A to 8H show waveforms of signals generated at the main part of the embodiment of FIG. 2 in the forward slow reproduction mode.
Figure 8B:
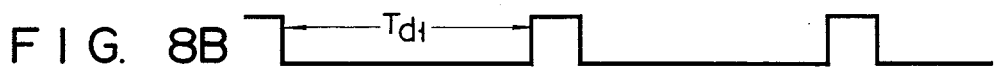
Figure 8C:

The mode of operation of the forward/reverse slow motion image reproduction system with the above arrangement according to one embodiment of the present invention will be described. Assume that the slow reproduction speed is set at ⅓ the normal speed (⅓ slow mode). RF switching pulse signal 96 having a waveform of FIG. 8A is supplied through input terminal 98 to mono-multivibrator 90 which is included in the slow reproduction mode designation section 52 of FIG. 2. Based on RF switching pulse signal 96, frequency division is performed so as to set the ⅓ slow mode by the mono-multivibrator 90. A slow speed signal 142 which has a waveform of FIG. 8B is supplied from B terminal 108 and the $\overline{Q}$ terminal 109 of mono-multivibrator 90. Mono-multivibrator 92 determines the drive pulse width in response to slow speed signal 142 and generates a drive pulse signal 144 of the waveform of FIG. 8C. In the ⅓ slow mode, the duration corresponding to about four fields is required for completely stopping tape 2. Therefore, a delay time $T_{d1}$ (FIG. 8B) of mono-multivibrator 90 corresponds to five fields which, in turn, correspond to 8.33 msec. A drive pulse signal 144 is supplied to drive pulse generator 82 which is included in drive circuit 68, so that transistors 70 and 76 are rendered conductive. At the same time, based on slow speed signal 142 and slow reproduction mode switching signal 112 supplied through input terminal 114, flip-flop 94 generates mode designation signal 54. Mode designation signal 54 indicates the forward or reverse mode. When the operator is to set the forward slow reproduction mode, mode designation signal 54 is set at high potential. At this time, transistors 70 and 76 are rendered conductive in response to mode designation signal 54 so that relay circuit 66 supplies power source voltage $+V_{CC}$ without reversing the polarity thereof to capstan motor 64. Therefore, capstan motor 64 rotates in the forward direction and tape 2 is driven and transported in forward direction 16 by capstan 62.

Figure 8D:
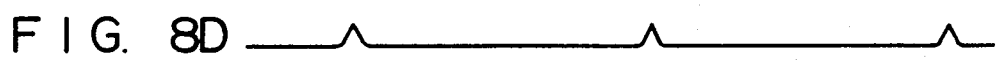
Figure 8E:
Figure 8F:
Figure 8G:
Figure 8H:
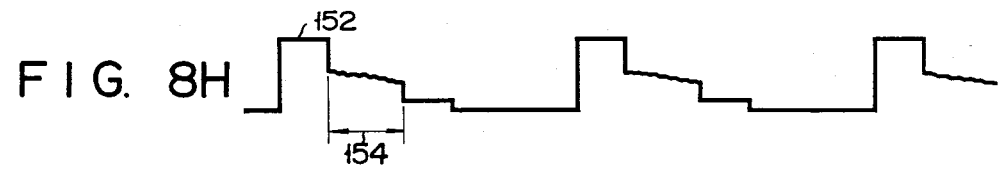

In this condition, control head 36 detects reproduction control pulse 28 pre-recorded on tape 2. Reproduction control signal 10 of the waveform of FIG. 8D is generated from signal amplifier 38. Control signal 10 is supplied to two pulse amplifiers 42 and 44. First pulse amplifier 42 only amplifies a positive pulse 146 and generates an output signal 146 of the waveform of FIG. 8E. Meanwhile, mode designation signal 54 of high level as described above is supplied from flip-flop 94 included in slow reproduction mode designation section 52. Therefore, switch circuit 46 transmits output signal 146 supplied from first pulse amplifier 42 to control section 50. Mono-multivibrator 56 which is included in control section 50 receives output signal 146 and adjusts the tracking delay variable and generates a signal 148 of the waveform of FIG. 8E. In response to signal 148, mono-multivibrator 58 determines the brake pulse width in accordance with the slow motion speed and generates a brake pulse signal 150 of the waveform of FIG. 8G. In response to brake pulse signal 150, brake pulse generator 84 of drive circuit 68 operates. Thus, transistors 72 and 74 are rendered conductive. A drive voltage $+V_{CC}$ of opposite polarity is applied to relay circuit 66. As a result, a negative voltage is applied to capstan motor 64, so that capstan 62 is abruptly stopped and magnetic tape 2 is subsequently stopped. By repeating this operation, tape 2 is intermittently traveled in the forward direction 16. Meanwhile, a current of the stepped waveform of FIG. 8H flows in capstan motor 64. Capstan motor 64 rotates abruptly in the forward direction by means of a high current component 152. In duration 154 from the end of driving the motor to the beginning of braking the motor, motor terminals are open so that capstan motor 64 rotates with inertia. Capstan motor 64 stops abruptly by means of the negative voltage.

Figure 9A:
FIGS. 9A to 9D show waveforms of signals generated in the main parts of the embodiment of FIG. 2 in the reverse slow reproduction mode.
Figure 9B:
Figure 9C:
Figure 9D:

On the other hand, in the reverse slow reproduction mode, mode designation signal 54 of low level is generated from flip-flop 94 of slow reproduction mode designating section 52. Relay circuit 66 reverses the polarity of drive voltage supplied from drive circuit 68. Therefore, capstan motor 64 rotates in the reverse direction and tape 2 travels in reverse direction 20. Reproduction control signal 10 detected by control head 36 has a waveform as shown in FIG. 9A. An output signal 160 of a waveform shown in FIG. 9B is generated from second pulse amplifier 44. In response to mode designation signal 54 of low level, switch circuit 46 transmits output signal 160 to control section 50. At this time, the output signals from mono-multivibrators 56 and 58 which are included in control section 50 have waveforms as shown in FIGS. 9C and 9D, respectively. Other aspects of this mode of operation are the same as those in the forward slow mode. Magnetic tape 2 in the reverse slow mode is intermittently driven and traveled in reverse direction 20.

According to the present invention, control section 50 controls the brake timing of capstan motor 64 so as to stop tape 2 at the same position corresponding to substantially the central point between the pulses of one polarity which are included in reproduction control signal 10 in the forward and reverse slow reproduction modes. This point at which tape 2 is stopped will be described with reference to FIG. 7. Referring to FIG. 7, tape 2 is properly and abruptly stopped at central point 10c between reference pulse 12-1 which is first detected and which is included in control signal 10 and next reference pulse 12-2. This central point 10c corresponds to reference pulse 14-1 of the other polarity. When magnetic tape 2 is stopped at central point 10c, the braking period in which the reference pulse is first detected and tape 2 is abruptly stopped becomes the same in the forward and reverse slow reproduction modes. Therefore, well-balanced braking characteristics are accomplished in the forward and reverse slow reproduction modes. Further, a uniform tracking tolerance may be given for the braking characteristic of capstan motor 64 in the forward and reverse directions.

When tape 2 is stopped at central point 10c, the trace initiating point for second field track 6-1 of first and second heads 122 and 124 mounted on rotating drum 30 matches point J. In such a still reproduction mode, first and second heads 122 and 124 trace on the track along the direction indicated by an arrow 170 of FIG. 7 (an arrow 171 shows a loci of the heads in the normal reproduction mode). However, third and fourth heads 126 and 128 which are used in slow reproduction trace on diagonal line 136 of desired track 6-1 along the direction inducted by an arrow 172 in the figure. As described above, third and fourth heads 126 and 128 are arranged at rotating drum 30, and have level difference X defined by relation (4) from first and second heads 122 and 124 for normal recording/reproducing. Therefore, in the forward and reverse slow reproduction modes, especially, in the still reproduction mode of slow reproduction mode, third and fourth heads 126 and 128 are used for special reproduction trace on diagonal line 136 of the desired field track. The area which is traced by third and fourth heads 126 and 128 in the still reproduction mode is the area indicated by a thick solid line 174.

Thus, the reproduction output of the video signal is increased and noise components such as crosstalk are reduced. An envelope 176 of the reproduction head output for one-frame duration consisting of first and second fields is shown in FIG. 7. In this manner, the S/N ratio of the reproduced image is improved and the image quality in the forward and reverse reproduction modes is greatly improved.

The operation of slow reproduction mode designation section 52 for changing the slow motion speed will be described. When the slow speed is to be changed from $\frac{1}{3}$ the normal speed to $\frac{1}{4}$ the normal speed, RF switching pulse signal 96 shown in FIG. 10A (the waveform of RF switching pulse signal 96 is first shown in FIG. 8A and again shown in FIG. 10A for easy understanding) is frequency-divided by the mono-multivibrator 90. As shown in FIG. 10B, delay time $T_{d2}$ of the slow speed signal 142 is set as shown in FIG. 10B. At this time, a leading edge 180 of RF switching pulse signal 96 of FIG. 10A indicates the moment at which tape 2 is constantly in the stop mode regardless of the value of slow speed and whether the reproduction system is in the forward slow reproduction mode or the reverse slow reproduction mode. Therefore, leading edge 180 of RF switching pulse signal 96 as reference data is supplied to flip-flop 94. Flip-flop 94 generates the mode designation signal which indicates the forward or reverse slow reproduction mode, so that relay circuit 66 which is included in capstan drive section 60 is switched. The operator arbitrarily switches to the forward or reverse slow reproduction mode. When this switching operation is performed in the slow reproduction period M in which tape 2 is being traveled, the switching operation is not smoothly performed. This may cause noise. However, according to the present invention, the switching signal is constantly generated at leading edge 182 of slow speed signal 142 (FIG. 10B) which is present in the duration S for which tape 2 is stopped, and which serves as the frequency-dividing switching pulse. Therefore, even when the operator arbitrarily changes to the slow reproduction speed, the speed change operation is performed only after leading edge 182 of slow speed signal 142 appears. The slow reproduction speed is changed always during stopping duration S of tape 2. Therefore, the slow speed is smoothly changed and electrical switching noise is prevented. Further, even if the slow speed is arbitrarily changed, the image quality of the reproduced image is maintained high.

Figure 5B:
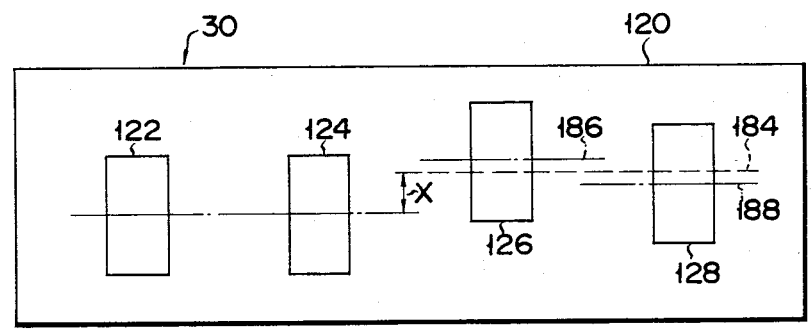

Although the present invention has been shown and described with respect to a particular embodiment, nevertheless, various changes and modifications which are obvious to a person skilled in the art to which the invention pertains are deemed to lie within the spirit, scope, and contemplation of the invention. For example, in the above embodiment, third and fourth heads 126 and 128 for special reproduction are disposed on periphery 120 of rotating head so as to be aligned with virtual reference line 132. However, in the reverse slow reproduction mode, the level of third and fourth heads 126 and 128 may be changed as shown in FIG. 5B in order to further reduce the noise component which appears on the screen owing to the crosstalk included in the normal speed reproduction mode. In this case, a central line 184 between a central line 186 of third head 126 and a central line 188 of fourth head 128 must be set to have level difference X from virtual reference line 130 of first and second heads 122 and 124. Thus, the same effect as in the embodiment of the present invention is also obtained. Slow reproduction in the forward or reverse direction may be performed while providing images of excellent quality.

Further, in the above embodiment, setting conditions such as the width of the heads for special reproduction, and the drive timing, the driving duration and the supply voltage of capstan motor 64 may be arbitrarily selected.

What is claimed is:

1. A video signal reproducing system for slow motion reproduction of video signals which are recorded on a tape, said system comprising:

a pair of alternately rotatable recording heads for recording said video signals on said tape, mounted on diametrically opposed sides of a rotating member, said video signals being recorded on video tracks disposed contiguously and obliquely relative to the longitudinal direction of the tape, said recording heads having gaps with mutually different azimuth angles, each of said tracks corresponding to one of control signals recorded on said tape and said control signals being alternatley recorded with different polarities for selecting one of the recording heads in the reproduction mode;

tape transporting means for intermittently operating the tape so that said tape runs alternately in a normal reproduction mode and a still reproduction mode, either in forward or reverse operation, the normal reproduction mode and the still reproduction mode being repeated;

a pair of rotary heads, having the same azimuth angle as the azimuth angle of the gap on either one of the recording heads, which are exclusively used in the reproduction mode; and control means for detecting said control signals and for causing said transporting means to move into the still reproduction mode from the normal reproduction mode in response to said detected control signals, said control means causing said tape transporting means to substantially stop said tape at a point which corresponds to the middle point between two adjacent control signals, each having the same polarity, and whereby the time required to move from the normal reproduction mode to the still reproduction mode is equally defined for forward and reverse slow motion reproduction.

2. A video reproduction system according to claim 1, further comprising:

slow reproduction mode designation means for making said tape transporting means set a driving direction of said tape in accordance with one of said forward or reverse sloe reproduction modes;

drive means, connected to said control means and said slow reproduction mode designation means, for driving said tape transporting means in response to said control means and said slow reproduction mode designating means; wherein said slow reproduction mode designating means includes signal generating means for generating a mode designation signal which is selectively set at a first potential in the forward slow reproduction mode and at a second potential in the reverse slow reproduction mode;

said drive menas includes motor means rotated in one of the forward or reverse directions in response to the polarity of an applied voltage for supplying a drive force to said tape transport means, and relay means for switching the poloarity of a voltage applied to said motor means in response to said mode designation signal from said signal generating means; wherein said first potential of said mode designation signal is switched to said second potential when said motor means is being stopped; and said tape transporting means includes a capstan.

3. A video signal reproducing system according to claim 1, wherein:

said exclusive reproduction heads are mounted on diametrically opposed sides of a rotating drum, and a plane, which is formed parallel to the edge of the drum and intersects the respective centers of both of said reproduction heads, is displaced a distance X from a parallel plane which is formed through the intersection of the respective centers of both of said recording heads.

4. A video reproduction system accordingly to claim 3, wherein:

said displacement distance X is defined by:

$$X = P \cdot \left( \frac{1}{2} \cdot \frac{H - P}{2P} \right)$$

where P is a pitch between the recording tracks, and H is a head width of the recording heads.

5. A method for performing slow motion reproduction which comprises still and normal reproduction in either forward or reverse directions, comprising the steps of:

detecting pulse signals recorded on a magnetic tape corresponding to video track positions, said video track positions extending obliquely to the longitudinal direction of the tape with substantially no space therebetween;

generating an electrical signal including reference pulses of a single polarity which correspond to the mode type of said forward and reverse slow motion reproduction modes, said reference pulses being generated at a constant period;

stopping said magnetic tape, when one of said reference pulses is first received during said still reproduction, at a location corresponding to a time between the reception of said reference pulse and substantially half the reference pulse period, irrespective of whether the forward or reverse slow motion reproduction mode is presently established; and causing a pair of rotary heads for the slow motion reproduction mode having the same azimuth angle to trace along a substantially diagonal line on a predetermined video recording track, defined on said tape stopped, to reproduce a video signal from the video recording track having the same azimuth angle as that of said heads.

6. A helical scanning type video reproduction apparatus for causing a magnetic tape to run in a forward or a reverse direction, said magnetic tape having video tracks formed thereon by a first pair of rotary heads with different azimuth angles for recording at a normal running speed so as to extend obliquely with respect to the longitudinal direction of the magnetic tape, adjacent video tracks having different azimuth angles, said video reproduction apparatus comprising:

slow reproduction mode designating means for generating a mode designation signal to specify either the forward slow motion reproduction mode or reverse slow motion reproduction mode;

tape running control means, connected to said slow motion reproduction mode designating means, for controlling said magnetic tape to run in a direction defined by said specified slow motion reproduction mode in response to said mode designation signal so that the tape runs alternatley at a normal reproduction speed and a still condition substantially corresponding to still reproduction, said tape running control means including, reference pulse generator means for detecting pulse signals, which are pre-recorded on a control track formed on the magnetic tape and extending in the longitudinal direction of the tape and which correspond to the video track positions thereon, and for generating an electrical signal including reference pulses of one polarity which correspond to said specified slow motion reproduction mode, said reference pulses being generated at a constant period, and brake means, connected to said reference pulse generator means, for, when receiving the first reference pulse at said still reproduction, fully braking said tape within half the period of said reference pulse irrespective of the mode of said forward or reverse slow reproduction, thereby stopping said tape at the middle of said reference pulse period; and slow motion reproduction means including a drum having a first pair of heads and a second pair of magentic heads mounted on a periphery thereof, said second pair of magnetic heads having one of said azimuth angles and being used for slow motion reproduction, said slow motion reproduction means permitting said second pair of heads to trace said magnetic tape to reproduce video signals recorded on video tracks having the corresponding azimuth angles, said second pair of heads being displaced from said first pair of heads in an axial direction of said drum by such a distance that, when said tape is in said still reproduction mode, said second pair of heads trace that video track on said tape which has the same azimuth angle as said second pair of heads substantially along the diagonal line of said video track, whereby at both said forward and reverse slow reproduction the amount of video signals reproduced by said second pair of heads at still reproduction are substantially the same and have a maximum signal-to-noise ratio.

7. A helical scanning type video reproduction apparatus according to claim 6, wherein:

said axial displacement between said first and second pairs of heads is given by:

$$X = P\left(\frac{1}{2} \cdot \frac{H - P}{2P}\right)$$

where X is said axial displacement, P is a pitch between the video tracks, and H is a head width of said first pair of heads.

* * * * *